Fig. 1

Nov. 19, 1935.   M. CLARK   2,021,173
PRESS WELDER FOR METAL DOORS
Filed Nov. 27, 1931   7 Sheets-Sheet 2

Fig. 2

INVENTOR.
Malcolm Clark
BY
Barnest Kissell
ATTORNEYS

Nov. 19, 1935. M. CLARK 2,021,173
PRESS WELDER FOR METAL DOORS
Filed Nov. 27, 1931 7 Sheets-Sheet 6

INVENTOR.
Malcolm Clark
BY
Barnes & Kissell
ATTORNEYS

Patented Nov. 19, 1935

2,021,173

UNITED STATES PATENT OFFICE 2,021,173

PRESS WELDER FOR METAL DOORS

Malcolm Clark, Warren, Ohio, assignor to The Taylor-Winfield Corporation, Warren, Ohio, a corporation of Ohio Application November 27, 1931, Serial No. 577,566

11 Claims. (Cl. 219—4)

This invention relates to a press welder for metal doors, and has to do particularly with a novel welding press adapted to weld a vehicle door in one operation and the method of operating the same.

The present invention contemplates the welding of sheet metal door overlaps by projection welding. More specifically, the present invention resides in the provision of an automatically operated single unit welding press for projection welding the entire overlap of the metal door in one operation, the machine making possible the projection welding of the door as at 22, 32 or as many points as desired. Other features of my novel machine and process include the necessary application of pressure prior to the initial welding step, the application of pressure after the welding step, and the timing of the welding operation in between two pressure applications.

Other features reside in the arrangement and operation of the controls, both manual and automatic, for determining the regulating of the successive welding operations, together with other details of structure as will be more clearly brought out in the specification and claims.

In the embodiment of the invention illustrated in the drawings, the press is provided with a suitable head 2 containing the power cylinders 3 and 4, said head being connected by means of suitable standards 5 with a base member 6. A top member of the welder may be generally designated 7 and is adapted to be actuated by the pistons 8 and 9 and guided during such actuation by the standards 5.

In the preferred embodiment of my press, I mount a transformer 10 at each corner of the base member. A distributor ring 11 extends around the press and the transformers are connected to this ring at the corners of the press.

Figure 1:
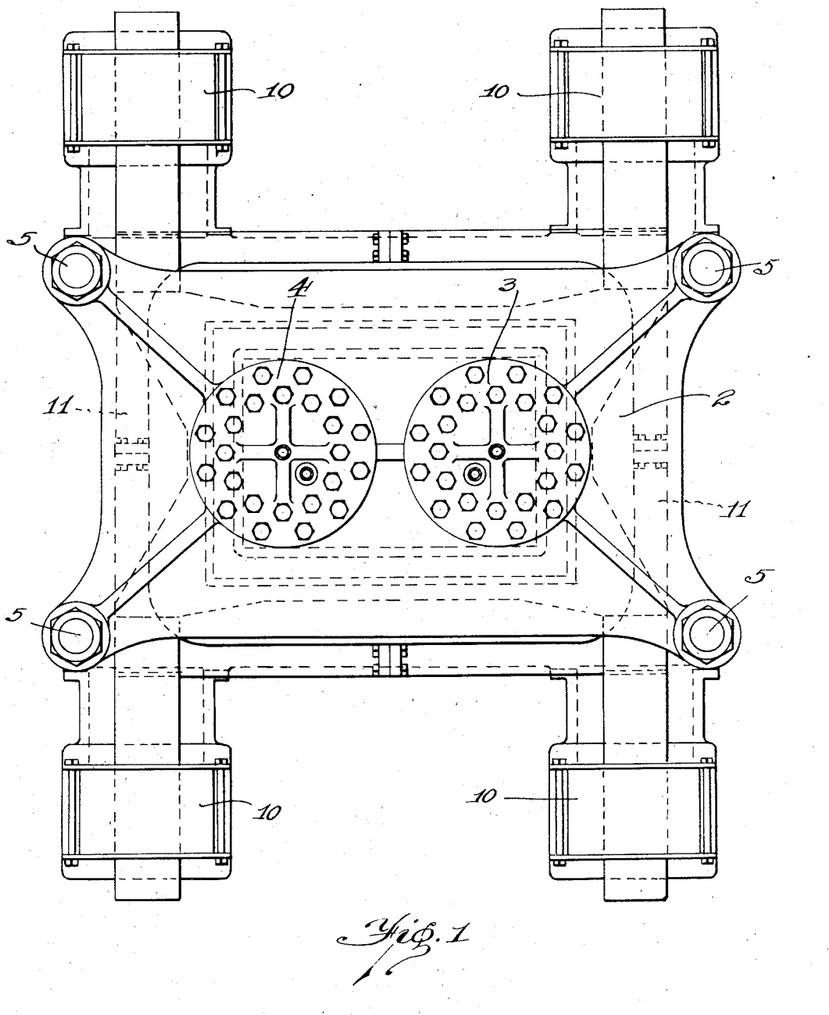
Fig. 1 is a plan view of my press welder illustrating particularly the operating cylinders and the manner of connecting and arranging the transformers.
Figure 2:
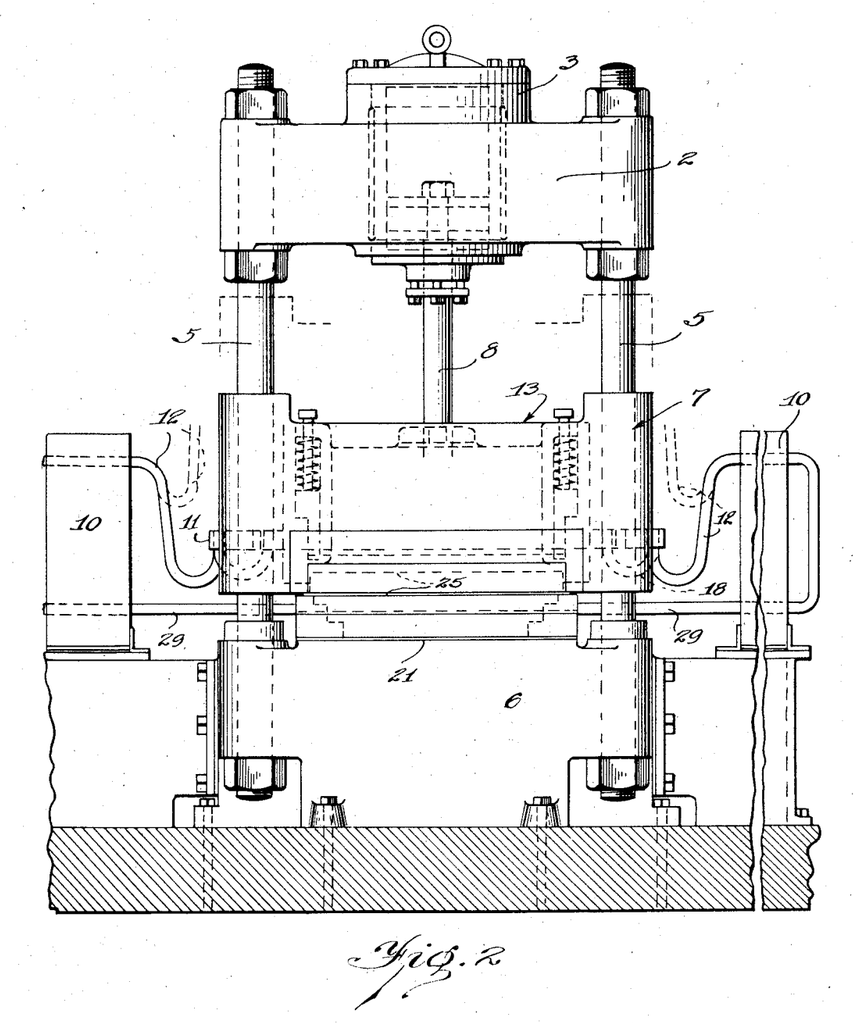
Fig. 2 is a side or end view and illustrating particularly the raised and lowered position of the removable top die and the flexibility of the connecting cables.

The head 7 is normally designed for a stroke clearance of approximately twelve inches and the cables 12 connecting the transformers with the distributor ring are so designed and arranged as to move with the head, as best shown in solid and dotted lines in Fig. 2. The top member 7 is adapted to support an upper welder and forming die which may be generally designated 13 and the base member 6 is adapted to support a lower welder and forming die 14.

Figure 3:
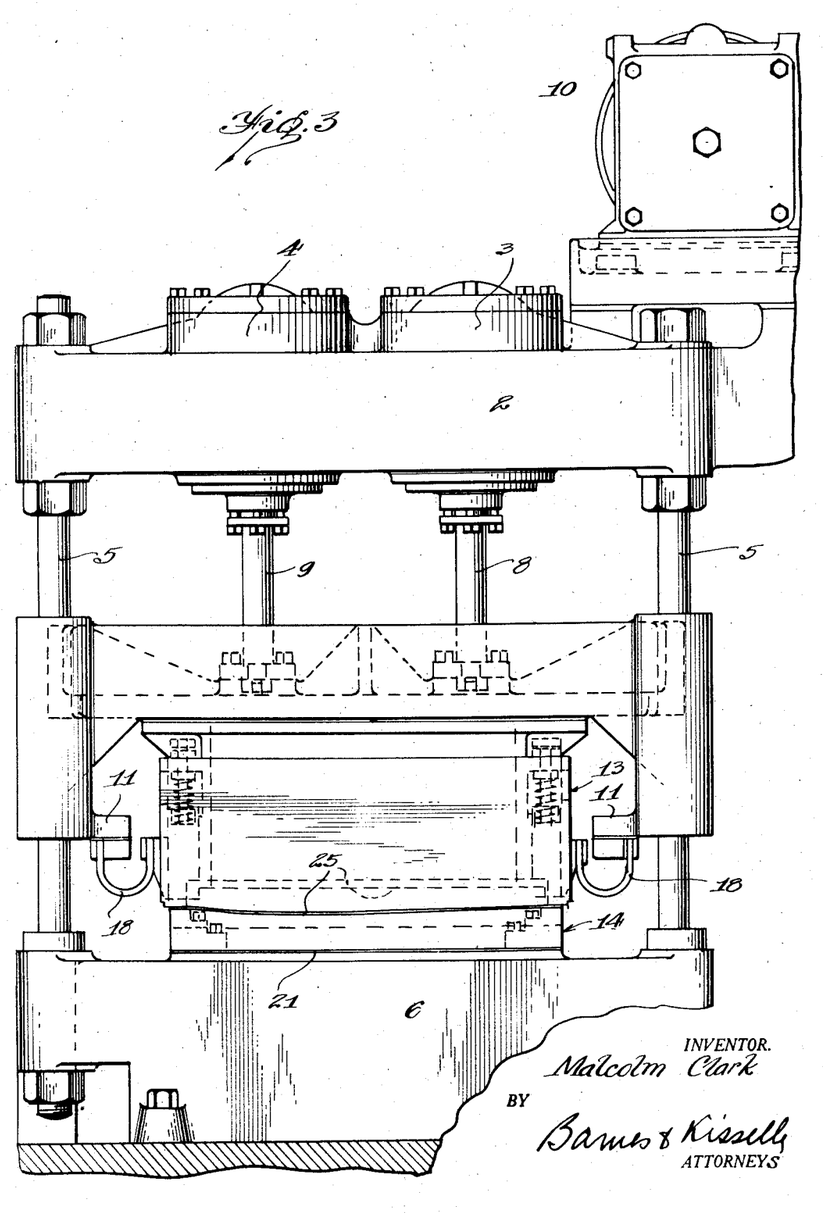
Fig. 3 is a front view of the press with the welding forming die in lower position against the overlap of the door.
Figures 4, 5:
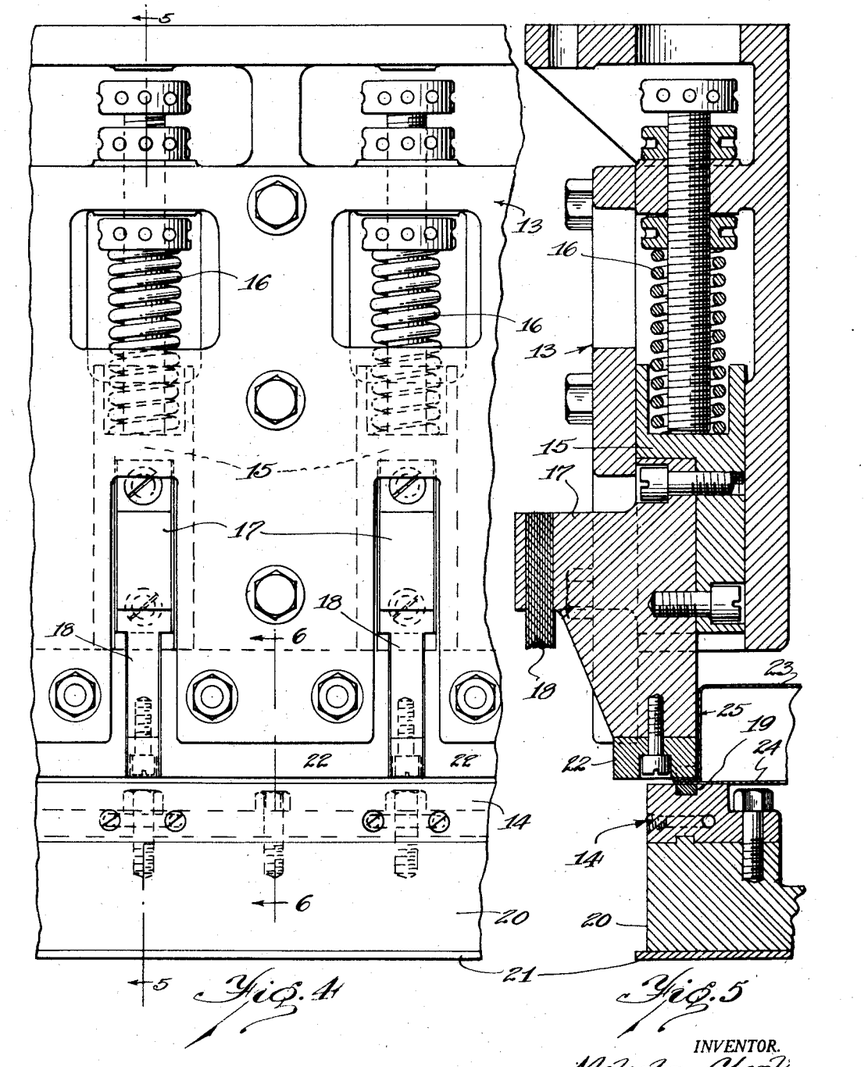
Fig. 4 is an enlarged fragmentary view of a portion of the welder and forming die shown in Figs. 2 and 3.
Fig. 5 is a sectional view taken through line 5—5 of Fig. 4 and through the welding die.

Fig. 4 is an enlarged fragmentary view of a section of the welder and forming dies. The welding dies which extend completely around the top die unit each consists of a steel slide 15 backed by an adjustable stop and spring member 16. A connector unit 17 formed of copper is bolted to the steel slide 15 and is adapted to carry a flexible cable 18 which is connected to the distributor ring as best shown in Figs. 2 and 3. The welding button 19 at the bottom of the connector member 17 is preferably formed of a suitable alloy material. The lower die 14 is shown clamped to a copper base 20, to which the transformer is also clamped and a layer of insulating material 21 separates the lower die unit from the base member 6. In Fig. 5 the metal car door is shown in its finally formed position between the welding dies. It will be understood that the welding dies may be spaced apart and as many in number to correspond to the number of projection welds desired in the particular door.

Figures 6, 7:
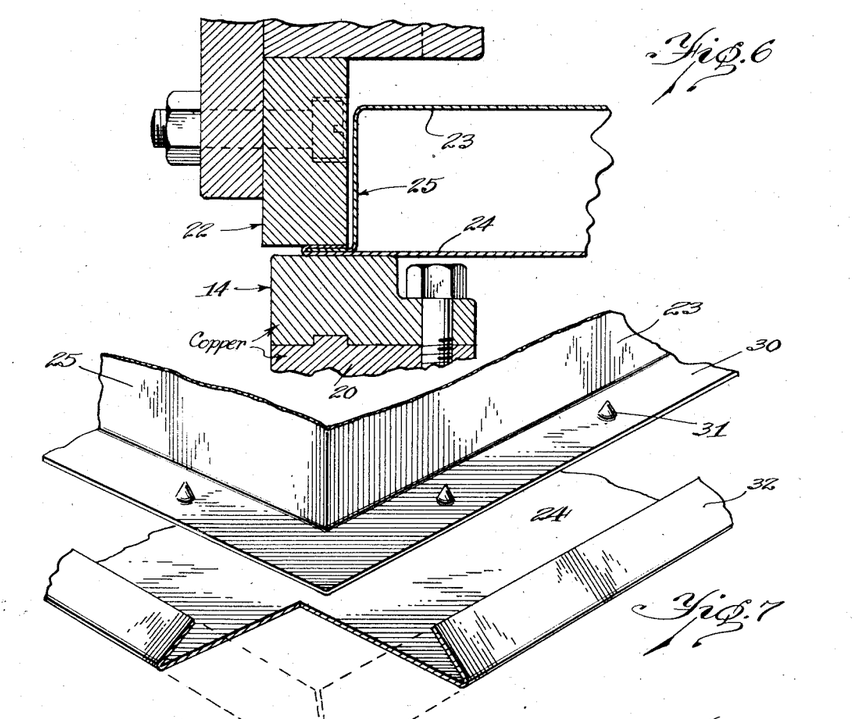
Fig. 6 is a fragmentary sectional view taken on line 6—6 of Fig. 4 or through the forming die.
Fig. 7 is an enlarged fragmentary perspective view showing a corner of the outer door panel cut out and the flange bent inwardly to a position preparatory to welding, the corner of the inner door panel being shown positioned away from the outer door panel to more clearly illustrate the projections.

In Fig. 6 I have shown a section taken through the forming dies wherein the bottom die member 14 is constructed similar to the welding die member with the exception of the welding button. The top die member 22 takes the form shown. It will be seen by referring to Fig. 4 that the top forming die members 22 are separated by the welding die members. The door shown in Fig. 6 is of standard form and consists of an inner panel 23 and an outer panel 24, the edge of the outer panel overlapping the flange of the inner panel to form a three ply overlap flange. In the preferred arrangement of my press welder the door is preferably fed in from the end of the press and I have shown such a door as at 25 in Fig. 2.

Figure 11:
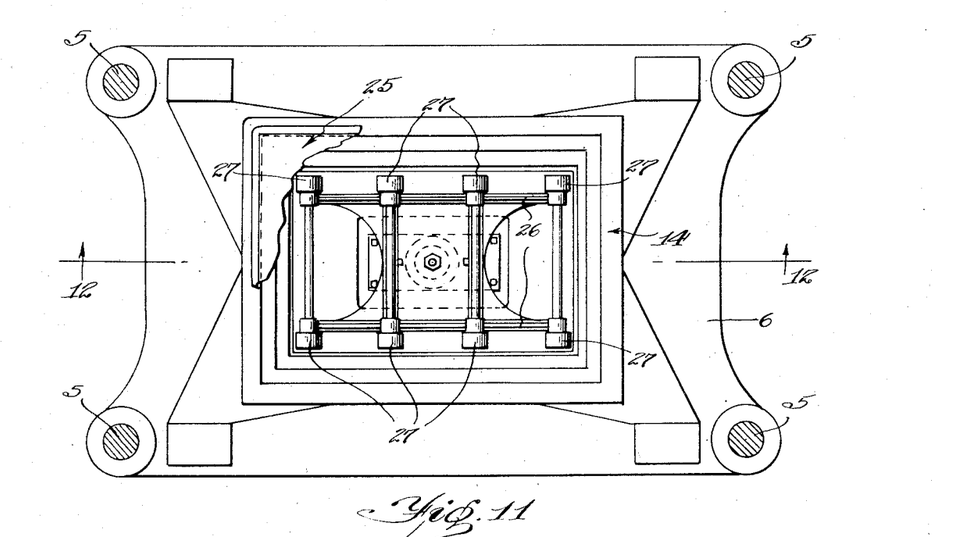
Fig. 11 is a cross sectional view of the bottom part of the press illustrating the conveyor and push out for loading and unloading the doors.
Figure 12:
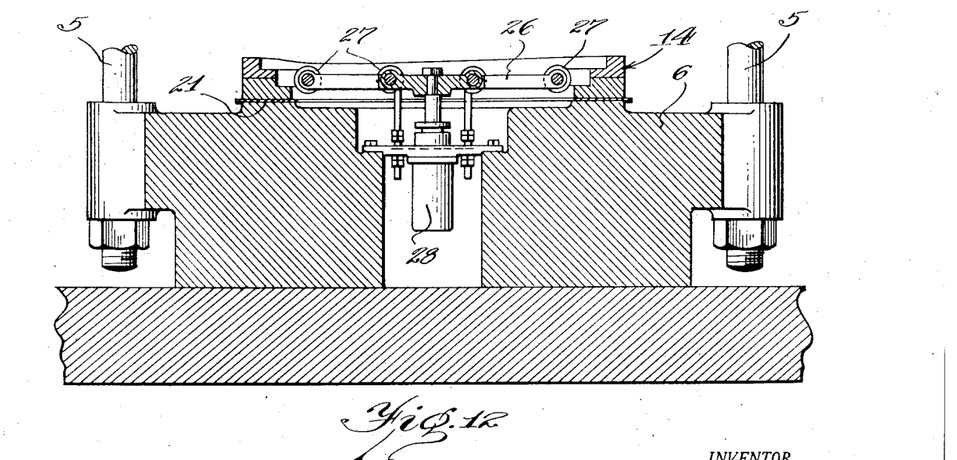
Fig. 12 is a sectional view taken on line 12—12 of Fig. 11.

As best shown in Figs. 11 and 12, the base member is provided with a suitable conveyor and push out for assisting in loading and unloading the doors from the press. This conveyor consists of a suitable frame 26 carrying rollers 27 of rubber or other material, and the entire unit being relatively movable as a push out by means of the piston and cylinder construction 28, a two and one-half inch lift being found to be suitable in most cases. As best shown in Fig. 11, the door is fed in from the right and between the standards 5, welded and then removed. Referring to Fig. 2, the path of the current from the transformers is through the cables 12 to the distributor ring and through each of the U-shaped cables 18 to the separate welding dies, the path of the secondary circuit being through the cable 29 to the lower die.

Figures 8, 9, 10:
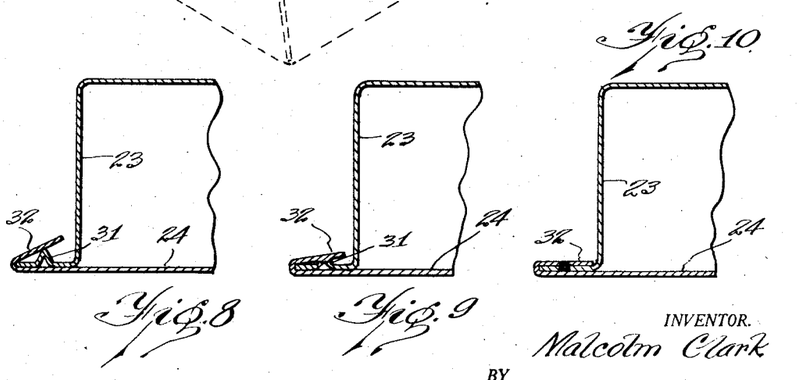
Fig. 8 is a fragmentary sectional view illustrating the first step in the method of turning over the flange of the outer door panel to a position closely adjacent the projections.
Fig. 9 is a view similar to Fig. 8 illustrating the pressure and welding step.
Fig. 10 is a view similar to Figs. 8 and 9 illustrating the final pressure step of forming the flange subsequent to the start of the welding operation.

The particular shape and type of door may vary considerably, but in general, and as best shown in Figs. 7 to 10, the inner panel 23 is provided with a flange 30 around which are formed spaced projections 31. The outer panel 24 is provided with a flange 32 which is bent over to an angle of substantially 20° from the horizontal as the first step in the process. The inner and outer panels being telescoped and the outer flange being bent over to this 20° position, as best shown in Fig. 8, as the first step in the process. The bending of the flange 32 to the position shown in Figs. 7 and 8 may be accomplished after the door panels have been inserted in the press welder or such flange may be initially bent over and the door inserted in the press welder in the form shown in Fig. 8. As the next step in the process, the flange 32 is bent downwardly until it contacts with the point of the projections 31 and after the flange 32 contacts with the points with suitable pressure the welding current is turned on with the result that the projections 31 become electrodes in the welding step and the welding takes place at the point of contact between these projection electrodes and the flange 32. This welding step continues for a predetermined length of time during which the metal surrounding the welding points becomes slightly plastic. Welding is then discontinued and further pressure applied to the flange 32 by the forming dies so that the three ply flange of the door is pressed "home" as shown in Fig. 10. In this way all spots formed by the welding will appear on the face of the flange 32, and the outer or exposed surface of the outer panel 24 will be free of all welding marks with the result that the door will be completely finished ready for use and requiring not even a polishing operation. By the positive applying of pressure before the welding step, the predetermined duration of the welding step and the application of pressure at the end of the welding operation, it will be seen that I have provided a method of obtaining not only a neat, compact and secure weld, but a joint that is uniform for every door.

Figure 13:
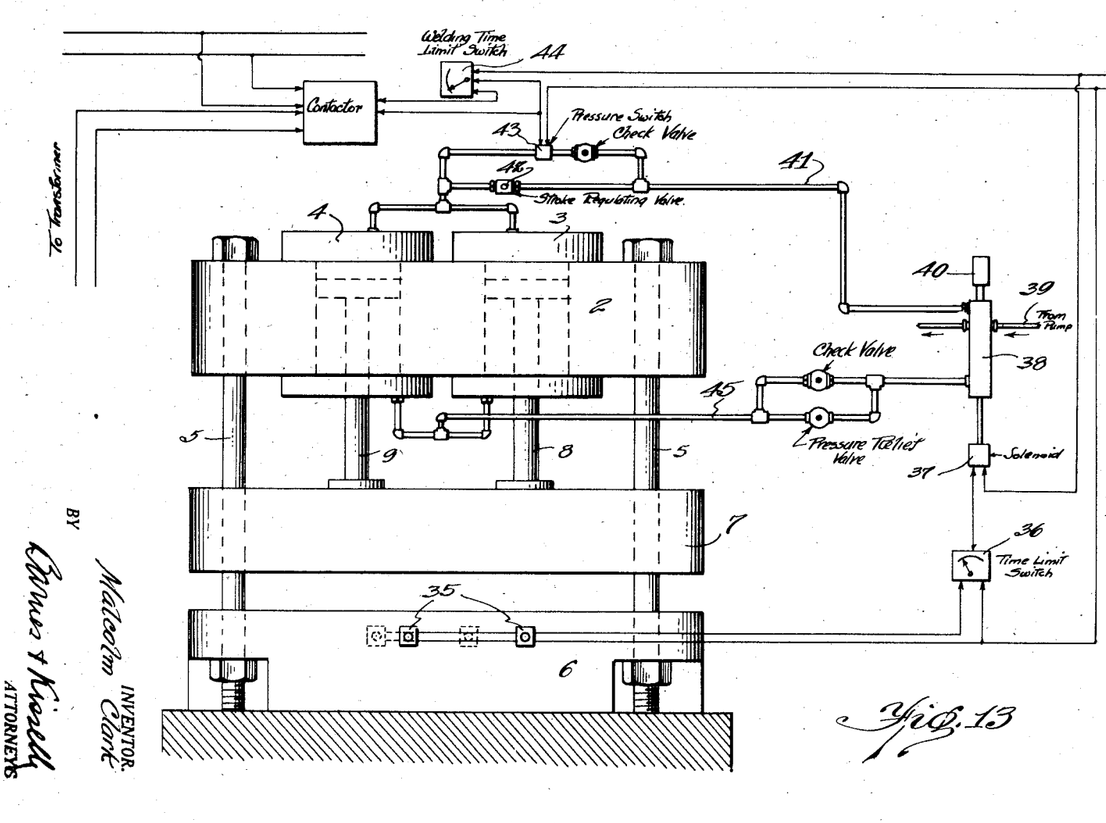
Fig. 13 is a diagrammatic layout illustrating a pipe and wire diagram for controlling the pressure and welding operations of the press.

The means for regulating the pressure and welding operations is best shown diagrammatically in Fig. 13 wherein a plurality of push buttons 35 are arranged on opposite sides of the press, said push buttons being so wired as to require actuation of all the buttons before actuation of the press. Suitable operation of all the push buttons will actuate a time limit switch 36 for controlling the duration of the operating stroke. This time limit switch will cause actuation of a solenoid 37 which in turn operates a valve 38 for controlling the flow of liquid from the pressure conduit 39 into one side or the other of the cylinders 3 and 4. The action of the solenoid is against a spring diagrammatically shown at 40, so that when the time limit switch 36 completes its operation, the valve will be returned to its return stroke position by the spring. Movement of the valve 38 will permit liquid under pressure to pass through the conduit 41, through the stroke regulating valve 42 and into the cylinders. Operation of the cylinders will cause the upper member 7 of the upper die to descend towards door engaging position, and as the upper die strikes the flange 32 of the door and bends the same downwardly it will be obvious that pressure will be developed. The pressure switch 43 is so designed as to be actuated only upon the building up of a certain pressure, say, two hundred pounds, at which point the welding time limit switch 44 will come into actuation. This time limit switch 44 determines the length of duration of the welding operation. The minute that sufficient pressure is developed in the switch 43 the welding current will be turned on and such welding current will remain on until the operating lever of the switch 44 completes its time limit operation, when the welding current will be automatically turned off. The pressure stroke will continue after the termination of the welding step to completely flatten out and form the flange overlap and to take advantage of the slightly plastic state of the metal around the projection welding points and assist in flattening out the projections themselves. The pressure applied to the projection welded flange will terminate upon the completion of the time operation of the switch 36, at which time the valve 38 will be reversed to direct the flow of liquid under pressure through the conduit 45 to raise the top member 7 for the next operation. It will be understood that the pump or other source of power for delivering liquid under pressure to the conduit 39 may be of any standard form such, for instance, as a variable delivery pump.

What I claim is:

1. The steps in welding together of marginal flanges of sheet metal panels, one of which is provided with projections, which consist in creating pressure between one flange and said projections and moving the flange relative to the projections in one continuous stroke, welding the flanges together at said projections during a certain part of said stroke, and predetermining the time of welding relative to the start of said stroke by the amount of pressure created between said flange and projections.

2. The steps in welding together of marginal flanges of sheet metal panels, one of which is provided with projections, which consist in creating pressure between one flange and said projections and moving the flange relative to the projections in one continuous stroke, welding the flanges together at said projections during a certain part of said stroke, and predetermining the time of and duration of welding relative to the start of said stroke by the amount of pressure created between said flange and projections.

3. The steps in welding together of marginal flanges of sheet metal panels, one of which is provided with a plurality of spaced projections, which consists in moving one flange towards the other, continuing the relative movement between said flanges until sufficient pressure has been developed therebetween as to cause positive contact between all the projections and the other flange, predetermining the time and duration of welding by the creation of such an amount of pressure between said flange and projections, and then continuing the relative movement between the flanges to finally shape the complete flange formation while the portions of the flanges adjacent the projections are still heated from the welding step.

4. A welding press for projection welding the marginal flanges of sheet metal inner and outer door panels of the type having one of the flanges provided with a plurality of projections spaced around the periphery thereof, comprising welding dies for registering with the projections, fluid pressure means for directly moving the welding dies relative to the flanges to press one of the flanges against the projections of the other flange, and means actuated only upon the building up of a certain pressure between said flange and said plurality of projections by said fluid pressure means for turning the welding current on and off.

5. A welding press for projection welding the marginal flanges of sheet metal inner and outer door panels of the type having one of the flanges provided with projections spaced around the periphery thereof, comprising welding dies for registering with the projections, fluid pressure means for directly moving the welding dies relative to the flanges to press one of the flanges against projections of the other flange, transformers mounted on the press, and means actuated only upon the building up of a certain pressure between said flange and said projections by said fluid pressure means for turning the welding current on and off.

6. A welding press for projection welding the marginal flanges of sheet metal inner and outer door panels of the type having one of the flanges provided with projections spaced around the periphery thereof; comprising welding dies for registering with the projections, fluid pressure means for directly moving the welding dies relative to the flanges to press one of the flanges against the projections of the other flange, means actuated only upon the building up of a certain pressure between said flange and said projections for turning the welding current on and off, and means for automatically turning off the welding current after a predetermined time, and independently of the duration of application of pressure.

7. A welding press for projection welding the marginal flanges of sheet metal inner and outer door panels of the type having one of the flanges provided with projections spaced around the periphery thereof, comprising welding dies for registering with the projections, means for moving the welding dies relative to the flanges to press one of the flanges against the projections of the other flange, means actuated only upon the building up of a certain pressure between said flange and said projections for turning the welding current on and off, means dependent upon but operable independently of said second named means for automatically turning off the welding current after a predetermined time, and means for increasing the pressure between said flanges while said flanges are still heated from the welding current.

8. A welding press for projection welding the marginal flanges of sheet metal inner and outer door panels of the type having one of the flanges provided with projections spaced around the periphery thereof, comprising a general forming die, spaced welding dies slidably carried by the forming die for registering with the projections, means for moving the forming die relative to the flanges to press one of the flanges against the projections of the other flange, means actuated only upon the building up of a sufficient pressure to cause positive contact between said flange and all of said projections for turning the welding current on and off, means operable independently of any pressure application for automatically turning off the welding current after a predetermined time, means for continuing the pressure between said flanges while said flanges are still heated from the welding current, and a time switch for controlling the actuating means for said dies.

9. A welding press for projection welding the marginal flanges of sheet metal inner and outer door panels of the type having one of the flanges provided with projections spaced around the periphery thereof, comprising welding dies for registering with the projections, means for moving the welding dies relative to the flanges to press one of the flanges against the projections of the other flange, means actuated only upon the building up of a certain pressure between said flange and said projections for turning the welding current on and off, means dependent upon but operable independently of said second named means for automatically turning off the welding current after a predetermined time, and means for continuing the pressure between said flanges while said flanges are still heated from the welding current, said welding dies being spaced completely around the periphery of the door, and forming dies positioned in between the welding dies.

10. A welding press for projection welding the marginal flanges of sheet metal inner and outer door panels of the type having one of the flanges provided with a plurality of projections spaced around the periphery thereof, comprising a forming die for registering generally with the marginal flanges, a plurality of welding dies registering with the individual projections, fluid pressure means for directly moving the forming dies relative to the flanges to cause movement of one of the flanges against the projections of the other flange, means actuated only upon the continued movement of said forming die and the building up of a sufficient pressure to cause positive contact between said flange and all of said projections, and a welding time limit switch actuated only by the building up of said predetermined pressure during the forming die stroke, and means for continuing the forming die stroke to move the flanges into final form after completion of the welding period, whereby the welding period is spaced a predetermined time from the start and stop of the forming die stroke.

11. In a welding device, a movable electrode, fluid pressure means for moving said electrode to operating position including a piston connected to the electrode, a cylinder in which said piston works, a switch for controlling an electric circuit between the electrodes, fluid pressure means for actuating said switch, fluid operated means for controlling the stroke of said piston and electrode, and means controlled by the creation of pressure at the first part of the stroke of said piston for rendering said last named fluid pressure means operative, said circuit automatically shutting off independently of any welding operation to permit the continuance of the piston and electrode stroke after the welding step.

MALCOLM CLARK.